UNITED STATES PATENT OFFICE.

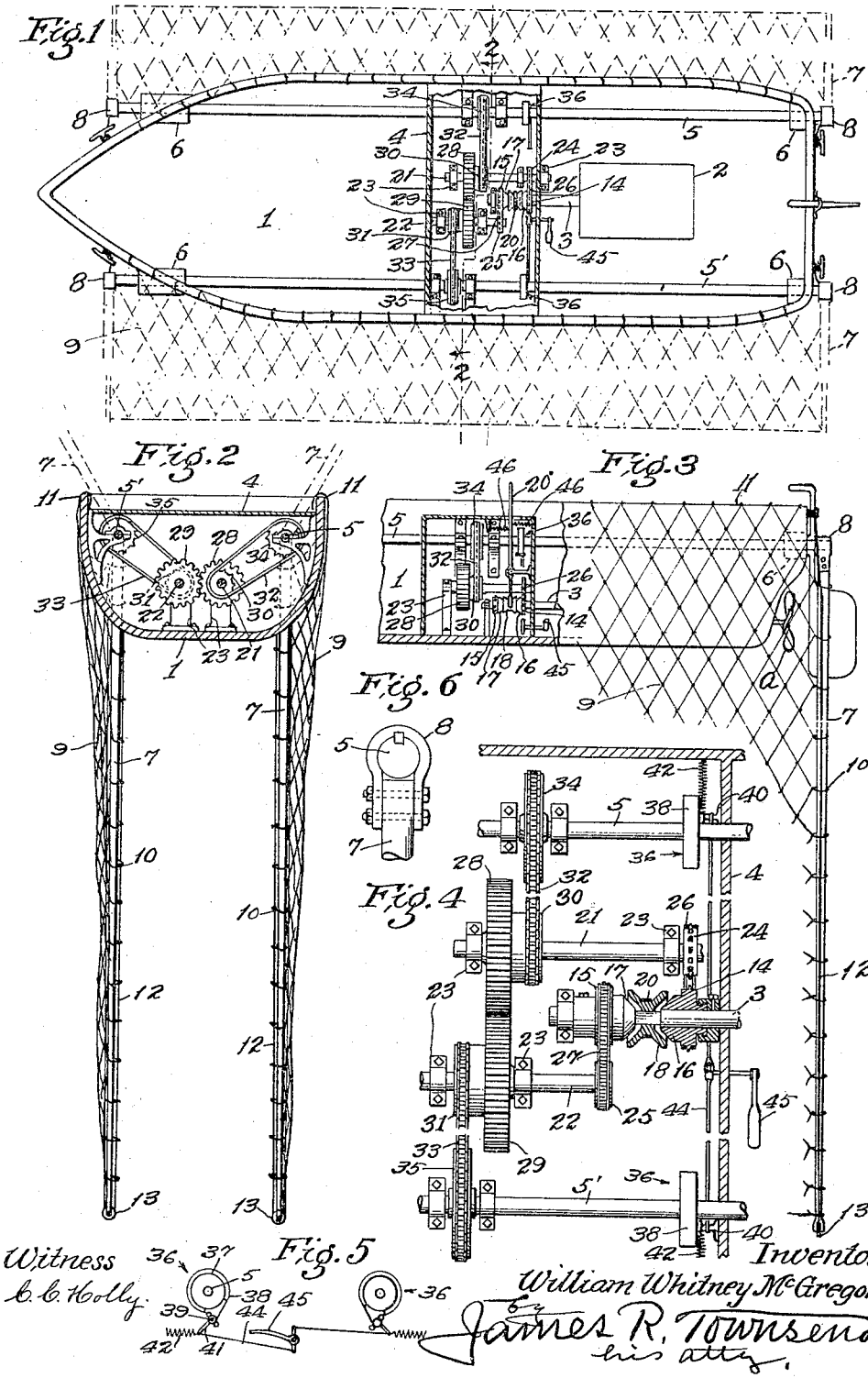

WILLIAM W. McGREGORY, OF PASADENA, CALIFORNIA.

POWER FISHING APPARATUS.

1,287,061.  Specification of Letters Patent.  Patented Dec. 10, 1918.

Application filed September 26, 1917. Serial No. 193,614.

*To all whom it may concern:*

Be it known that I, WILLIAM WHITNEY McGREGORY, a citizen of the United States, residing at 345 West California street, in the city of Pasadena, county of Los Angeles, and State of California, have invented a new and useful Power Fishing Apparatus, of which the following is a specification.

An object of this invention is to provide apparatus whereby fish which may be toled close to a fishing vessel may be easily removed from the water and deposited in the vessel. This invention is more particularly intended for use in tuna fishing, but is applicable for catching other kinds of fish, as will hereinafter more fully appear.

The invention is broadly new and pioneer in that there is combined with a vessel such as a fishing boat or float, a net connected to spars that are in turn connected to power apparatus inside of the vessel by which the spars may be swung from a pendant position in the water, to an elevated position above the level of the sides of the vessel, or other receptacle adapted to receive them, so that fish that are within the sweep of the net will be lifted out of the water and caused by gravity to slide down into such receptacle or vessel.

It is important in practical application of this invention that a net with lifting spars be applied to each side of the vessel so that they may operate in conjunction with each other to preserve the equilibrium of the vessel. In carrying out the invention any suitable form of vessel may be employed and in the accompanying drawings a power boat is made to indicate such vessel.

An object of the invention is to make it practicable to capture tuna in great quantities by power operated means and an advantage gained is the capture of the fish without struggle and loading the boat quickly so that the fish may be delivered to the cannery with great expedition so as to avoid impairing of the flavor or quality of the fish.

Heretofore it has been deemed impracticable to catch tuna with nets, for the reason that the tuna is a very large and heavy fish and appears to die and become a dead weight very quickly after being caught in a net, the shock of being caught by a net appearing to cause such fish to become a dead weight. It is customary in catching the tuna for fishermen in a boat to tole the tuna to the surface with baited hook and line; as the usual depth at which such fish stay is about 60 fathoms. The tuna fish are toled to near the surface and then live fish are thrown into the water to act as further bait and when the bait fish see the tuna, they seek shelter in the shadow of the boat whenever the tuna come to the water on both sides of the boat to catch the fish. This invention is adapted to catch the tuna when thus toled to the boat. The tuna usually come in company with each other and in this invention I provide netting means adapted to hang down from each side of the boat, allowing the tuna to be toled to the water on both outer sides of said netting means and I have provided means for suddenly and simultaneously swinging up both of the netting means to catch and carry the tuna within the paths of said netting means up and out of the ocean so quickly as to land them in the boat before they die or become dead weights.

The novel means which I have invented for this purpose broadly include said netting means disposed on opposite sides of the boat but corresponding to each other so that they balance the boat and allow lifting the fish out of the water without capsizing the boat.

Other objects, advantages and features of invention may appear from the accompanying drawing, the subjoined detail description and the appended claims.

The accompanying drawing illustrates the invention.

Figure 1 is a plan of a power-operated fishing boat, in which this invention is applied; fragments of the spars and net in elevated position being indicated in broken lines.

Fig. 2 is a sectional elevation on line 2—2, Fig. 1, looking in the direction of the arrows.

Fig. 3 is a fragmental side elevation partly in section of the apparatus shown in Figs. 1 and 2.

Fig. 4 is an enlarged fragmental plan, partly in horizontal section, of the reversing mechanism for alternately raising and lowering the nets.

Fig. 5 is a diagrammatic elevation of the rock shaft controlling brake mechanism.

Fig. 6 is a detail of one end of a rock shaft, and a fragment of one of the spars attached thereto.

The size and proportions of the vessel, spars, net and the various operative parts is not necessarily shown in the drawing, and it is understood that the constructor will use his judgment as to matters of that kind so as to fit the boat for different kinds of fish and different seas and other waters.

The boat may be of any desired form and construction, and is indicated by the hull 1, which may be of any desired dimensions. The engine to furnish the power is diagrammatically indicated at 2 and may furnish power for the propeller $a$. Said engine is arranged and connected in any suitable way to drive a power shaft 3 and through such shaft, to drive suitable mechanism which is shown as being contained within a housing 4, and which connects the power shaft 3 with rock shafts 5, 5', that are journaled in bearings 6 on opposite sides of the boat, and that are each provided at the ends with spars 7 which are rigidly connected as at 8 with the rock shafts 5, 5'.

Nets 9 are connected by running rings 10 with the spars and each is of a length to span the open space between the spars 7 of the rock shafts respectively, and are of sufficient width to extend practically from the boat gunwales 11 respectively to the free ends of the spars. Net lines 12 rove through pulleys 13, at the ends of the spars respectively, and serve as means by which the nets may be spread or reefed as desired. By drawing in the lines the nets may be spread, and by releasing the lines the nets will be released so that the attendant may reef the nets.

The spars and their respective nets are equal to each other in length and other dimensions, so that they counter-balance each other, and high speed and heavy power mechanism as indicated in Figs. 1 and 3 is employed to operate the spars simultaneously and rapidly, so as to instantly remove the fish from the water and deposit them in the boat.

The mechanism which connects the power shaft with the rock shafts 5, 5', is constructed to oscillate the rock shafts reversely, and with this object in view there are provided two loose sprocket wheels 14, 15, spaced apart and journaled to rotate upon the shaft 3 and provided with non-sliding clutch members 16, 17, respectively. A sliding double clutch member 18 non-rotatably mounted upon the shaft 3 and rotating with said shaft and sliding therealong, is operable by a clutch lever 20 to alternatively engage the loose clutch members 16, 17 at the extremes, respectively, of the sliding movement of said sliding clutch member, and to be free from engagement with said sliding clutch member at the intermediate or neutral position of said sliding clutch member.

Jackshafts 21, 22 are journaled by boxes 23 in parallelism with the power shaft 3; and are respectively provided with sprocket wheels 24, 25, that are fixed to said jackshafts and are connected respectively by sprocket chains 26, 27 with the power sprocket wheels 14, 15, thus forming two sprocket trains leading to the jack-shafts, respectively, so that at one extreme position of the double clutch member 18 one jack-shaft will be driven, and at the other extreme position of the double clutch member, the other jack-shaft will be driven. At the intermediate or neutral position neither jack-shaft will be driven by power from shaft 3.

The jack-shafts are geared together for simultaneous reverse rotation by means of the sprocket gears 28, 29 meshing with each other. Jack-shaft transmitting sprocket wheels 30, 31 are fixed to rotate with the jack-shafts 21, 22, and are operably connected by the rock-shaft sprocket chains 32, 33, with the rock-shaft sprocket wheels 34, 35 that are fixed upon the rock-shaft 5, 5' respectively.

By moving the clutch lever 20 in one direction while the power shaft is rotating, the spars 7 will be simultaneously raised to elevate the nets, and may be brought to the upwardly slanting position shown in dotted lines in Fig. 2, so that fish that may be within the sweep of the net 9 will be lifted from the water to above the level of the sides of the vessel and will slide or roll down into the receptacle 1.

In practical use when the nets are spread and lowered as indicated in Fig. 2 the fisherman will throw bait into the water on both sides of the vessel, thus attracting the tuna or other fish to gather within the area which will be swept by the nets when the spars are swung upward.

It may be assumed that in the drawing when the clutch 18 is shifted aft the spars will be swung up and when it is shifted forward they will be swung down.

At the opportune moment, and while the shaft 3 is rotating, the operator will throw the clutch into the lifting position whereupon the rock-shaft will be sufficiently oscillated to lift the net so as to cause fish to be swept up from the water into the air, and to move by gravity from the net into the vessel. When this has been accomplished the lever will be shifted to neutral position; and when required will be moved into lowering position, thus to again lower the spars and the nets into the water.

Automatic band brake means that may be active when the clutch is neutral and may be neutral when the clutch is active are provided to prevent uncontrolled descent of the spars, and to allow the spars to be held at any position and to be lowered gradually when the clutch is neutral. Such brake means are indicated at 36 and may be of any suitable character.

In Fig. 5 a brake wheel 37 is fixed on the shaft 5 to rotate therewith. The brake band 38 is eccentrically connected to brake shaft 39 which is journaled in stationary bearings 40. The brake arm 41 of the brake shaft is normally held by spring 42 to tighten the band 38 to support the spar. A connecting rod 44 and foot-lever 45 controlled by the operator are adapted to release the brake, so as to leave the rock shafts free when the operator applies the power from shaft 3 to oscillate the rock shafts. The one foot-lever 45 is connected alike to each of the brake means 36.

The shifting clutch member 18 is normally held in neutral position by a spring device 46 which yields in either direction to allow the clutch to be operated as desired.

In practical use the brakes are normally set, so that the spars are held at rest. If the spars are in elevated position, the operator may simply lower them by operating the foot-lever. When he wishes to lift the net he will first tread on the foot-lever, and then suitably operate the controlling lever 20, thus raising the nets; and when the nets reach the appropriate elevation he will release both levers and allow them to come to neutral position.

By arranging a set of net-oscillating means, such as the spars 7, on opposite sides of the vessel and applying a net to each of said oscillating means and operating both of said means by a common operating mechanism as shown the nets may be practically instantly oscillated to sweep the spaces next to the opposite sides of the vessel 1. By this arrangement the opportunities for observation of the waters to be swept by the nets are maximized and the danger of capsizing is minimized.

I claim:

1. Fishing apparatus comprising a vessel, net oscillating means on one side of the vessel, net oscillating means on the other side of the vessel, both of said oscillating means being carried by the vessel, a net connected to one of said net oscillating means, a net connected to the other of said oscillating means and means to simultaneously oscillate both of said net oscillating means.

2. The combination with a vessel, of oppositely disposed net oscillating means, nets on said oscillating means on opposite sides of the vessel respectively, and means to simultaneously oscillate the nets from a lowered to an elevated position, and vice versa, the net and oscillating means on one side of said vessel counter-balancing the net and oscillating means on the other side of the vessel; and the oppositely arranged net oscillating means and nets being adapted to hang in parallelism with each other from opposite sides of the vessel.

3. The combination with a vessel, of rock-shafts oppositely disposed upon said vessel, spars connected to said rock shafts outside the vessel and adapted to hang downward and to be oscillated from lowered to elevated position, and means to simultaneously rock the rock shafts.

4. The combination with a vessel, of pairs of spars in parallelism with, and counterbalancing each other operably connected to the vessel on opposite sides thereof and adapted to hang downward and to be oscillated, nets spread by said spars on opposite sides of the vessel, respectively, means to oscillate the spars to swing the nets from lowered to elevated position, and means to lower the nets.

5. The combination with a vessel, of rock shafts oppositely disposed thereon; spars on said rock shafts to oscillate therewith; nets spread on and carried by said spars and extending to the sides of the vessel respectively; a power shaft; two power sprocket wheels rotatable relative to the power shaft; jack shafts; sprocket wheels on said jack shafts to rotate the same, sprocket chains connecting the power sprocket wheels with the jack shaft; sprocket wheels; reversing gears connecting the jack shafts; sprocket wheel and chain connections between one of the jack shafts and one of the rock shafts; sprocket wheel and chain connections between the other jack shaft and the other rock shaft; and a reversing clutch to alternately connect one of the power sprocket wheels with the power shaft and release the other power sprocket wheel from the power shaft.

6. The combination with a vessel, of rock shafts oppositely disposed thereon; spars on said rock shafts to oscillate therewith, nets spread on and carried by said spars and extending to the sides of the vessel respectively; a power shaft; two power sprocket wheels rotatable relative to the power shaft; jack-shafts; sprocket wheels on said jack-shafts to rotate the same; sprocket chains connecting the power sprocket wheels with the jack shaft-sprocket wheels; reversing gears connecting the jack shafts; sprocket wheel and chain connections between one of the jack-shafts and one of the rock-shafts; sprocket wheel and chain connections between the other jack-shaft and the other rock-shaft; and a reversing clutch to alternately connect one of the power sprocket wheels with the power shaft and release the other power sprocket wheel from the power shaft, and vice versa.

7. The combination with a vessel, of rock shafts oppositely disposed thereon; spars on said rock shafts to oscillate therewith, nets spread on and carried by said spars and extending to the sides of the vessel respectively; a power shaft; two power sprocket wheels rotatable relative to the power shaft; jack-shafts; sprocket wheels on said jack-shafts to rotate the same; sprocket chains connecting the power sprocket wheels with the jack shaft-sprocket wheels; reversing gears connecting the jack-shafts; sprocket wheel and chain connections between one of the jack-shafts and one of the rock-shafts; sprocket wheel and chain connections between the other jack-shaft and the other rock-shaft; a reversing clutch to alternately connect one of the power sprocket wheels with the power shaft and release the other power sprocket wheel from the power shaft, and vice versa; and yielding means to normally hold the reversing clutch neutral.

In testimony whereof, I have hereunto set my hand at Los Angeles, California, this 7th day of September, 1917.

WILLIAM W. McGREGORY.

Witness:
JAMES R. TOWNSEND.

Copies of this patent may be obtained for five cents each, by addressing the "Commissioner of Patents Washington, D. C."